(12) United States Patent
Cordaillat et al.

(10) Patent No.: US 6,770,160 B2
(45) Date of Patent: Aug. 3, 2004

(54) METHOD AND APPARATUS FOR MANUFACTURING TIRES

(75) Inventors: Dominique Cordaillat, Billom (FR); Olivier Muhlhoff, Clermont-Ferrand (FR); Bruno Panighel, Aulnat (FR)

(73) Assignees: Compagnie Generale des Etablissements, Clermont-Ferand (FR); Michelin-Michelin & Cie, Clermont-Ferand (FR)

( * ) Notice: Subject to any disclaimer, the term of this patent is extended or adjusted under 35 U.S.C. 154(b) by 196 days.

(21) Appl. No.: 10/100,807

(22) Filed: Mar. 19, 2002

(65) Prior Publication Data
US 2002/0096263 A1 Jul. 25, 2002

Related U.S. Application Data

(62) Division of application No. 09/299,229, filed on Apr. 23, 1999, now Pat. No. 6,408,419.
(60) Provisional application No. 60/096,943, filed on Aug. 18, 1998.

(30) Foreign Application Priority Data

Apr. 27, 1998 (FR) .............................. 98 05642

(51) Int. Cl.⁷ .............................................. B29D 30/32
(52) U.S. Cl. ....................... 156/132; 156/131; 156/133; 156/135
(58) Field of Search ................................. 156/131–133, 156/135, 398–403; 166/417; 152/539–541, 545, 660–662

(56) References Cited

U.S. PATENT DOCUMENTS 2,743,760 A    5/1956  Beckadolph et al.
2,838,092 A    6/1958  McMahon
3,093,531 A    6/1963  Fröhlich et al.
3,178,327 A    4/1965  Beckadolph et al.
3,232,817 A    2/1966  Nädler et al.
3,645,828 A    2/1972  Balle et al.
3,698,987 A   10/1972  Woodhall et al.
3,784,426 A    1/1974  Woodhall et al.
3,971,694 A    7/1976  Gazuit
4,087,306 A    5/1978  Head et al.
4,131,500 A   12/1978  Wilde et al.
5,772,836 A    6/1998  Ogawa
5,971,047 A   10/1999  Drieux et al.
6,179,028 B1   1/2001  Drieux et al.

FOREIGN PATENT DOCUMENTS

DE     1262581         3/1968
DE     2211657         9/1973
DE     2221806        11/1973
EP      467277 A1  *   1/1992
EP     0808707         4/1997
EP     0792739         9/1997
FR     2716645         9/1995
GB      947182         1/1964
JP    56089935         7/1981
JP    60092837         5/1985

* cited by examiner

*Primary Examiner*—Geoffrey L. Knable
(74) *Attorney, Agent, or Firm*—Burns, Doane, Swecker & Mathis, L.L.P.

(57) ABSTRACT

The invention concerns a method of manufacture of tires and a tire assembly drum having a body with a receiving surface for the products to be assembled, the body being mounted on a center shaft, and at least one lifting device situated at one of the ends of the receiving surface, the lifting device including a plurality of lifting fingers distributed circularly around the center shaft, the fingers extending appreciably radially and presenting a bearing surface for the products to be assembled, the fingers being controlled to be deployed essentially radially toward the outside of the drum.

4 Claims, 4 Drawing Sheets

METHOD AND APPARATUS FOR MANUFACTURING TIRES

CROSS REFERENCE TO RELATED APPLICATION(S)

This application is a divisional of U.S. patent application Ser. No. 09/299,229, filed Apr. 23, 1999, now U.S. Pat. No. 6,408,919 which claims priority to U.S. Provisional Application Serial No. 60/096,943, filed Aug. 18, 1998.

BACKGROUND OF THE INVENTION

The present invention concerns a method of manufacture of tires and an assembly drum making it possible to use the method.

The invention concerns, in particular, the manufacture of a tire comprising a carcass reinforcement, at least one reinforcing bead wire in each of the beads of the tire, around which the carcass reinforcement is wound, forming a turn-up, said tire being such that, in contrast to what is generally done, the turn-up of the carcass reinforcement is arranged between the bead wire and the carcass reinforcement itself. One can refer, in particular, to publication FR 2.716.645 for a best comprehension of the tire.

It is known that, in order to make turn-ups of the carcass reinforcement around the bead wire, the assembly drums are equipped with carcass reinforcement turn-up devices. It is possible to cite, by way of example, U.S. Pat. No. 3,698,987, which describes a turn-up device comprising a first inflatable bladder that is generally toroidal and whose displacement necessary for the turn-up operation is carried out by an intermediate element consisting of a second inflatable bladder or metal collar which exerts a transverse thrust on the first bladder. In U.S. Pat. No. 4,087,306, the turn-up device consists of a turn-up bladder which develops by itself, under the sole effect of elevation of inflation pressure, the rolling movement in the transverse direction necessary for carrying out the turn-up of the carcass reinforcement.

These drums and turn-up devices make possible the manufacture of tires using a process stage consisting, once the carcass reinforcement is positioned on the uninflated drum, that is to say in its smaller circumferential diameter, and the bead wires are axially opposite their locking position relative to the carcass, of inflating the drum in order to fix the positioning of the bead wires on the carcass reinforcement, and then of actuating the turn-up device, making possible the turn-up of each lateral end of the carcass reinforcement around the corresponding bead wire.

Such drums do not lend to a modification in the method of manufacture aimed at situating the turn-up of the carcass reinforcement under the bead wire. Insofar as operation of the turn-up device is made subject to the presence of a fixed point, consisting of the bead wire, around which the turn-up of the carcass reinforcement is made, it is impossible to see how the carcass reinforcement could be turned up, using the bead wire to fix the place of bending, while stringing the turn-up radially under said bead wire.

SUMMARY OF THE INVENTION

The invention therefore concerns a method of manufacture of a tire, in which the turn-up of the carcass reinforcement is positioned between the bead wire and said reinforcement, and an assembly drum making it possible to use that method.

According to the invention, the method of manufacture of a tire includes the following steps:

depositing a carcass reinforcement on a generally cylindrical receiving surface, then depositing a strip of rubber compound on one of the ends of the carcass reinforcement, then turning up said end around the strip of rubber compound, and positioning a bead wire on the turn-up thus made.

The turn-up of the end of the carcass reinforcement around the strip of rubber compound is advantageously made by radially raising said end, bringing the bead wire axially toward the center of the carcass reinforcement up to the bearing of the end on the bead wire, and continuing the axial advance of the bead wire in synchronization with expansion of the receiving surface.

In particular, the end of the carcass reinforcement is raised radially by pressing radially toward the outside of the drum, just under the strip of rubber compound. A turn-up of the carcass reinforcement is thus made around the strip by tilting the latter.

The invention also concerns a tire assembly drum having a body with a receiving surface for the products to be assembled, said element being mounted on a center shaft, characterized in that it contains at least one lifting device situated at one of the ends of the receiving surface, which comprises a plurality of lifting fingers distributed circularly around the center shaft, said fingers extending appreciably radially and presenting a bearing surface for the products to be assembled, said fingers being deployable essentially radially toward the outside of the drum movement of translation under the action of control means.

"Essentially radially" means a possible axial movement of the lifting fingers, if it exists, is negligible in the desired action.

Such a lifting device containing radially deployable elements makes it possible to elevate, relative to the receiving surface, the end of the products to be assembled and, owing to the composition of the elements in the form of fingers extending appreciably radially, to leave said raised end free and therefore accessible.

DESCRIPTION OF THE DRAWINGS

Other characteristics and advantages of the invention will appear on reading of an embodiment of the invention, with reference to the attached drawings, wherein.

DESCRIPTION OF PREFERRED EMBODIMENTS

Figure 1:
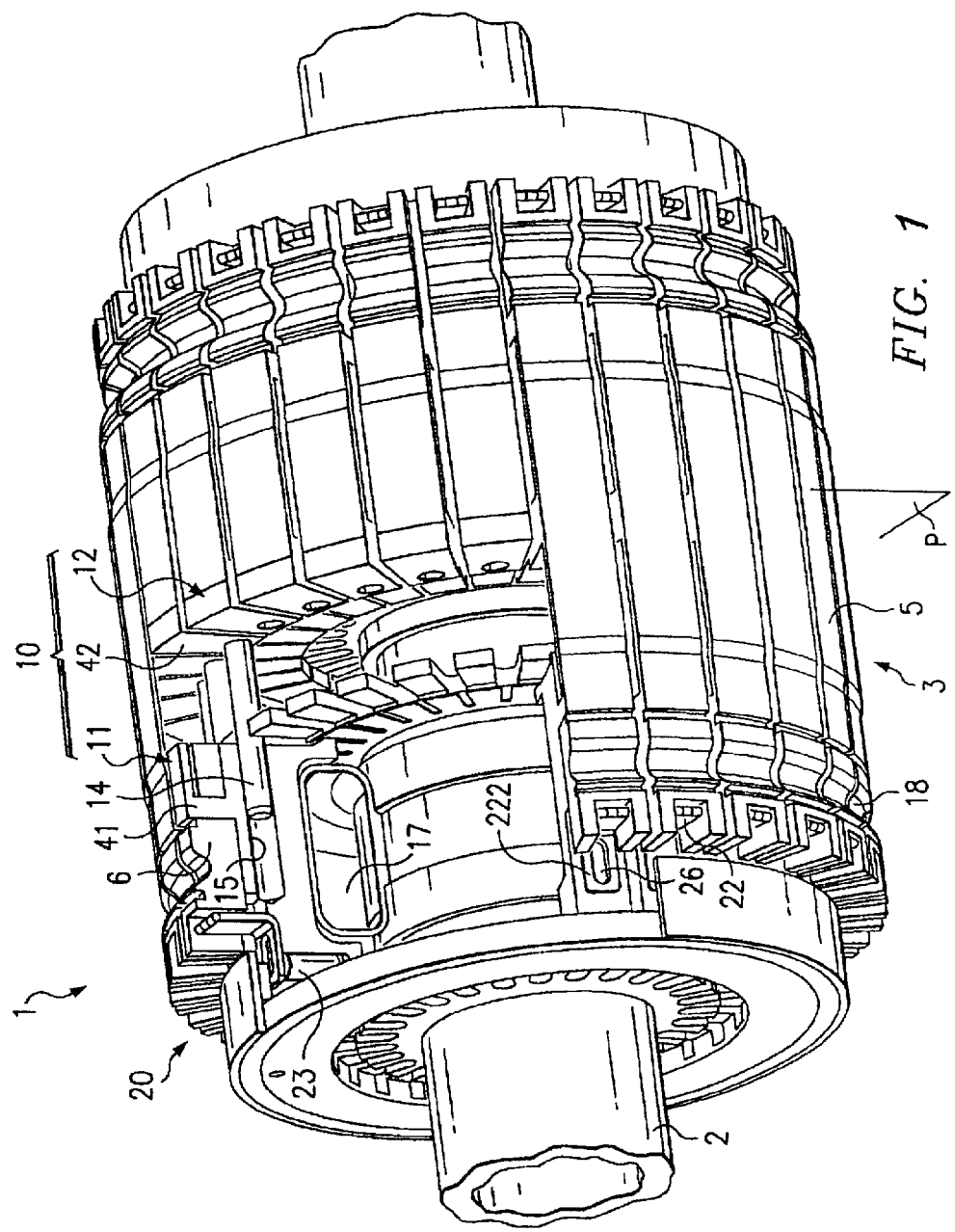
FIG. 1 is a perspective representation partially in section of a drum according to the invention.

According to FIG. 1, the radially expansible assembly drum 1 comprises a body 10 mounted on a center shaft 2 and having a surface 3 for receiving the products to be assembled.

The body 10 comprises two semicylinders 11 axially displaceable on the center shaft 2 in order to regulate the spacing of the bead wires of the tire to be made, the two semicylinders 11 being separated by a center ring 12 that is fixed in relation to the center shaft 2.

The drum described in this embodiment of the invention being symmetrical relative to a median plane P perpendicular to the axis of the drum, only the half-drum situated to the left of plane P in FIG. 1 will be described in the course of the specification. It is clear that the choice of the drum described here does not limit the scope of the invention to a symmetrical drum.

Semicylinder 11 and ring 12 consist of a plurality of segments 41 and 42, respectively, opposite each other. Segments 41 are juxtaposed circumferentially around the center shaft 2 and segments 42 are likewise juxtaposed circumferentially around the center shaft 2. To secure the connection of the different elements of the body 10, each segment 41 is guided in relation to the opposite segment 42 by means of a rod 14, the end of which crosses segment 42 and the other end of which is mounted sliding in a bore 15 made in segment 41.

To enable the drum 1 to reach its expanded position, the segments 41, 42 are radially movable under the action of an expansion chamber 17 placed under said segments 41 and inflatable under the control of jacks. In their radial movement, segments 41 carry along the segments 42 of the ring 12 by means of rods 14.

Figure 2:
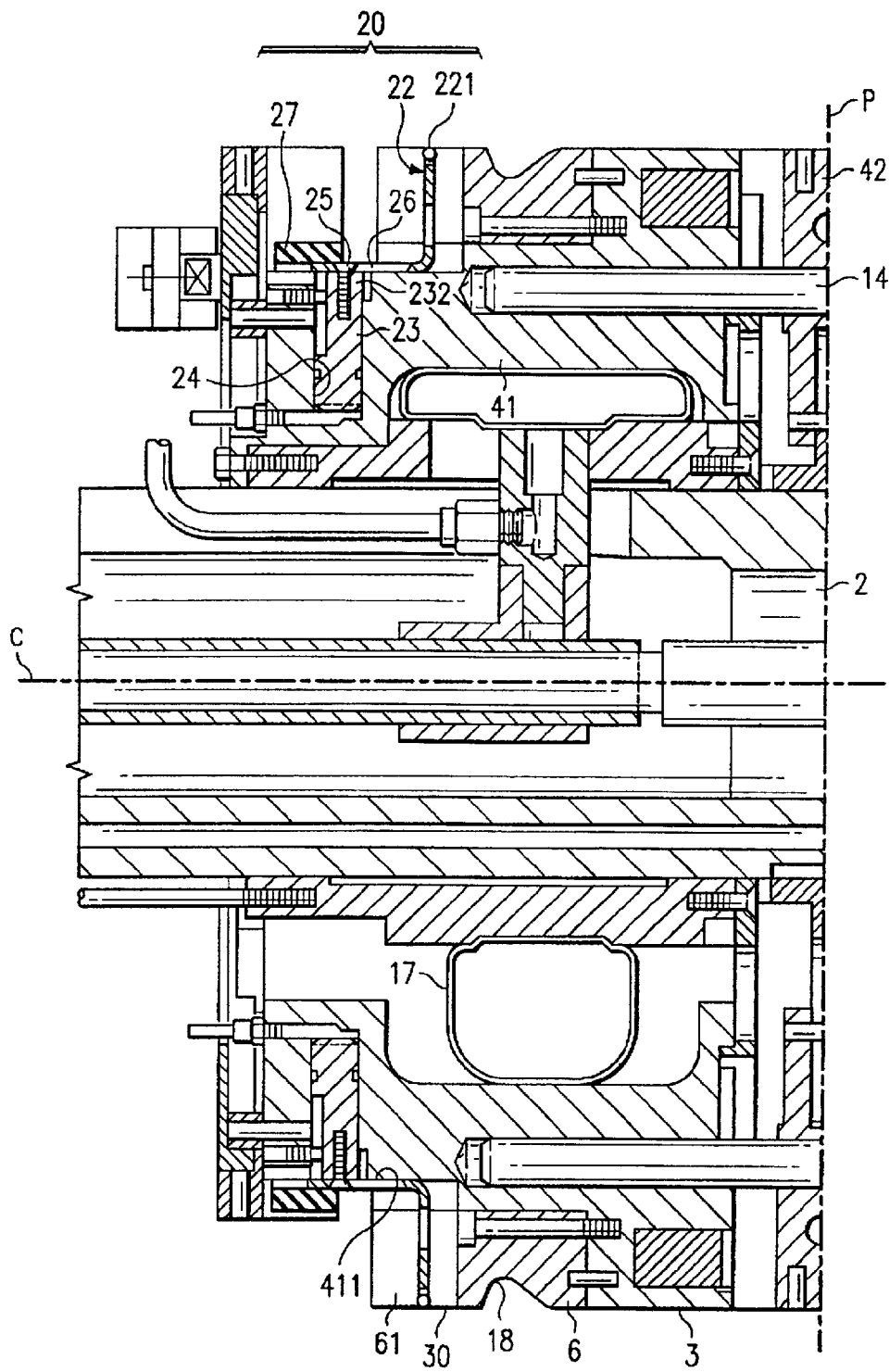
FIG. 2 is a partial axial section of the drum represented in FIG. 1 in two different configurations: at the top in retracted position, and at the bottom in expanded position.

FIG. 2 illustrates these two configurations:
above the axis C of the center shaft 2, the drum 1 is represented in retracted position, the expansion chamber 17 being deflated;
below the axis C of the center shaft 2, the drum 1 is represented in expanded position, the expansion chamber 17 being inflated.

Plates 5 (FIG. 1) are fastened by screws (not shown) on segments 42 of the ring 12. Those plates 5 cover segments 41 of semicylinder 11 at least partially, in order to ensure continuity between the ring 12 and semicylinder 11 for the products to be assembled, regardless of the axial position of semicylinder 11. The ring 12 further makes it possible to ensure axial holding of the plates 5 on radial expansion of the drum 1.

As FIGS. 1 and 2 show, segments 41 carry at their lateral ends directed outside the drum 1 support elements 6 bearing grooves 18 for receiving the bead wires of the tire. The receiving surface 3 for the products to be assembled thus consists of the group of exterior surfaces of plates 5, zones of segments 41 not covered by said plates and exterior surfaces of the support elements 6.

The drum 1 according to the invention carries a lifting device 20 placed at the free end 30 of the receiving surface 3, said free end 30 consisting of the exterior surface of the support elements 6. As is clear in the example chosen, the drum 1 being symmetrical, contains a lifting device at each of the ends of the receiving surface.

In the course of the specification, the term "finger" is understood to mean a profile of small section.

The lifting device 20 contains a plurality of lifting fingers 22 of rectangular section, distributed circularly around the center shaft 2 and extending appreciably radially.

These lifting fingers 22 are arranged axially, relative to the center of the drum 1, outside the receiving groove 18 a short distance away from the latter and respectively present a bearing surface 221 for the products to be assembled. The fingers 22 are mounted in radial displacement on segments 41 respectively, said fingers 22 being integral with segments 41 in the expansion movement of the drum 1.

Thus, the lifting fingers 22 are radially deployable toward the outside of the drum 1 by radial movement of translation, from a rest position in which the bearing surfaces 221 constitute an extension of the receiving surface 3, to a deployed position in which the bearing surfaces 221 constitute a cylindrical surface coaxial with the center shaft 2, of diameter greater than that of surface 3. Those lifting fingers 22 thus offer the products to be assembled a plurality of bearing surfaces 221 that are discontinuous and distributed circumferentially.

In deployed position the end zones of the products resting on the bearing surfaces 221 are therefore raised from the center part of said products resting on the receiving surface 3.

The free ends of the lifting fingers 22, that is, radially outside the drum 1, consist advantageously of a roller 28 mounted in free rotation on a pin 29 and thus carrying the bearing surface 221. That roller 28 makes it possible to avoid creating stresses in the products raised on deployment of the lifting fingers 22, ensuring in that phase a "rolling" contact between the fingers and the products.

Each finger 22 slides inside a channel 60 hollowed out in the corresponding support element 6 which comes out on said element outside surface. More precisely, the free end 61 of each support element 6, situated outside the drum 1 relative to the receiving groove 18, presents a U-section in a plane perpendicular to a radius, the arms of the U-section extending in axial directions. This arrangement makes it possible, at the time of placing the products whose ends are going to rest on the bearing surfaces 221, the lifting fingers 22 being at rest, to offer said ends a receiving surface extended all around surfaces 221. The ends of those products are then also supported by the U-shaped exterior surfaces 62 of the ends 61 of the support elements 6, which contribute to obtaining a correct positioning of the products on the drum 1.

In what follows, the same references designate the parts common to the different embodiments of the lifting device.

Figure 3:
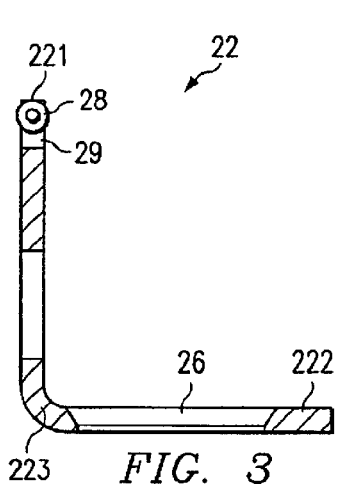
FIG. 3 is an enlargement of a lifting finger of the drum represented in FIG. 2.
Figure 4:
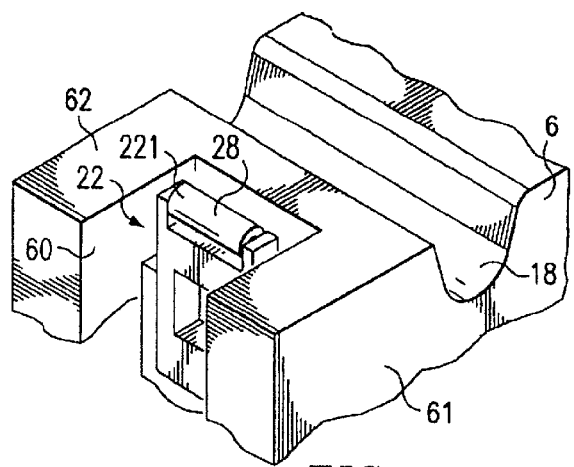
FIG. 4 is a partial perspective representation of the lifting finger represented in FIG. 3, arranged in a support element.

According to a first embodiment of the lifting device 20 represented on FIGS. 2 and 3, the radially interior end 223 of each lifting finger 22 on the drum 1 carries an axial extension 222. Each extension 222, in rest position of the lifting fingers 22, bears on a support surface 411 carried by the corresponding segment 41.

Each lifting finger 22 is driven by a jack 23, the extension 222 of said finger being fastened on an end 232 of the piston of the jack 23 by a screw 25. Each drive jack 23 is housed in a groove 24 borne by the corresponding segment 41, inside which the piston of the jack can slide and which comes out on the support surface 411 of said segment 41. The stroke of the drive jacks 23 limits radial displacement of the lifting fingers 22.

Fastening of the lifting fingers 22 on the corresponding segments 41 is thus carried out by fastening of said fingers on the drive jacks 23, which in turn are fastened directly on segments 41. Furthermore, the positioning of the lifting fingers 22 relative to the jacks 23 and, therefore, relative to segments 41 is adjustable. For that purpose, the axial extension 222 of each lifting finger 22 bears a hole 26 allowing passage of the screw 25. The positioning of the screw 25 in that hole 26 regulates the axial positioning of the lifting finger 22 relative to the jack 23 axially integral with the corresponding segment 41 and, consequently, positioning of the screw 25 in the hole 26 regulates the axial spacing of the finger 22 relative to the corresponding support element 6. In fact, as will be clearer on reading the method of manufacture, it is important to be able to adjust the axial positioning of the lifting fingers, notably, in accordance with the dimensions of the products placed.

In order to secure the return of the lifting fingers 22 to rest position, an elastic return belt 27 surrounds the set of axial extensions 222.

Figure 5A:
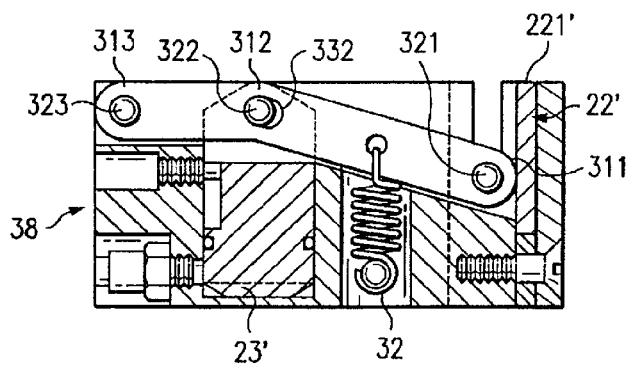
FIGS. 5A and 5B are enlargements of a lifting finger of the drum represented in FIG. 2 according to an embodiment of that finger in two operating positions.
Figure 6:
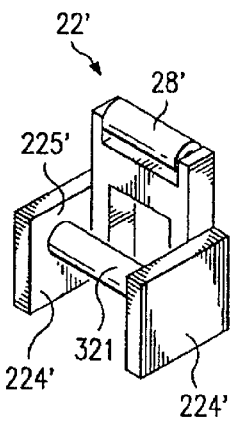
FIG. 6 is a perspective representation of the lifting finger represented in FIGS. 5A and 5B.
Figure 5B:
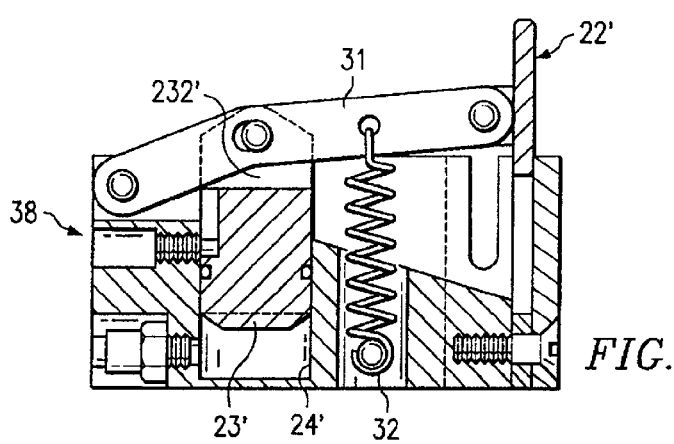

According to a second embodiment of the lifting device 20' represented in FIGS. 5A, 5B and 6, the lifting fingers 22' are mounted in radial displacement respectively on abase 38 fastened on the corresponding segment 41. The drive jacks 23' of the lifting fingers 22' are also borne respectively by the corresponding base 38 in a groove 24' inside which the piston of each jack slides.

The bases 38 are adjustable in axial position relative to the support elements 6 by a standard fastening not represented, such as screws.

Each lifting finger 22' is connected by means of a bent rod 31 to the jack 23' as follows:
- one of the ends 311 of the rod 31 is hinged on a pin 321 mounted between a first axial extension 224' borne by the side edge of the lifting finger 22' and a second axial extension 225' borne by the other side edge of said finger, the end 311 bearing an oblong hole for passage of the pin 321;
- the other end 313 of the rod 31 is hinged on a pin 323 fastened to the corresponding segment 41;
- the elbow 312 of the rod 31 is hinged on a pin 322 fastened to the end 232' of the piston of the drive jack 23', the elbow 312 bearing an oblong hole 332 for the passage of pin 322.

FIGS. 5A and 5B illustrate more in detail the respective positions of the parts borne by the base 38 with respect to the rest and deployed positions of the lifting finger 22'; FIG. 6 presents in perspective a lifting finger 22, illustrating an embodiment in which the free end of said finger bears a roller 28' mounted freely rotating.

In order to secure the return of each lifting finger 22' to rest position, a return spring 32 is mounted between each segment 41 and the corresponding rod 31, the radially interior end 223' of each lifting finger 22' on the drum 1 bearing, moreover, in rest position of said finger, on a support surface 411' carried by the segment 41.

The method of manufacture of a passenger car tire with radial carcass reinforcement will be described below, with reference to FIGS. 7A to 7F, comprising a carcass reinforcement and at least one reinforcing bead wire in each of the beads of said tire, and, in particular, the construction of one of those beads will be described, in which the carcass reinforcement forms a turn-up arranged between the bead wire and the carcass reinforcement itself.

The method of manufacture makes possible, of course, the building of a tire with either a single bead of the type described above or two beads of that type, and the example chosen of a passenger car tire with radial carcass should not limit the invention to that sole type of tire.

The equipment making it possible to use the method comprises, notably, the drum 1 and a guide bead wire 50 displaceable axially and coaxially to the center shaft 2. This guide bead wire 50 comprises a bead wire transfer ring, containing gripping edges acting radially and distributed over its circumference to ensure a concentric holding of the bead wire on the drum 1.

The lifting device 20 of the drum 1 containing lifting fingers 22 has been chosen here. However, the use of lifting fingers 22' could also be described, as can easily be understood from what follows.

The lifting device 20 of the drum 1 being at rest, the bearing surfaces 221 of the lifting fingers 22 extend the receiving surface 3. A textile cord ply is deposited on the receiving surface 3 of the drum 1 and on its lateral extensions, consisting of the surfaces 62 of the U-sections and the tearing surfaces 221 of the lifting fingers 22. This ply projects axially outside the drum 1, relative to the lifting fingers 22. This ply alone constitutes, in the example described here, carcass reinforcement A.

A profile of rubber compound P is then deposited on the lateral end zone of the carcass reinforcement A axially outside the receiving groove 18. This profile P possesses, in the example described, a quadrilateral-shaped section, but it is clear that other section shapes can be envisaged. Furthermore, in order to have a sufficiently hard profile P, a rubber compound with a Mooney ML (1+4) viscosity at 100° C., measured according to standard ASTM:D-1646, greater than or equal to 70, will preferably be chosen.

Figure 7A:
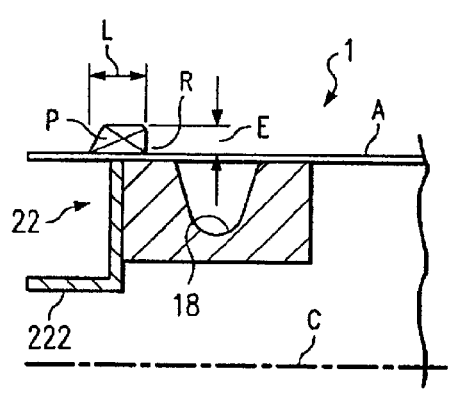
FIGS. 7A to 7F are schematic representations in partial axial section illustrating the different phases of manufacture of a tire according to the invention.

As FIG. 7A shows, profile P is deposited above the bearing surfaces 221 of the lifting fingers 22, in order to permit tilting of the latter on deployment of the fingers. In fact, point R, constituting a rigidity change point relative to carcass reinforcement A, is going to be used to control the building of a turn-up of the carcass reinforcement A and, therefore, a rotation of the latter around that point R. The turn-up is then going to be possible without the presence of a bead wire that usually constitutes the fixed point around which rotation takes place.

But it is also desirable for positioning of the strip to make it possible to obtain the tilting of said profile P in the receiving groove 18. Consequently, an adjustment of the axial position of the lifting fingers 22 relative to the receiving groove 18 will advantageously be chosen which depends on the thickness E of the profile P.

Designating by "L" the length of the strip resting on the carcass reinforcement A, the profile P can be positioned, for example, in relation to the lifting fingers 22, so that the latter are at a distance ranging between L/3 and 2L/3 from the rigidity change point R.

The lifting fingers 22 are then deployed under the action of jacks 23. The profile P is thus raised and turns around point R and end A' of the carcass reinforcement A is also raised. Not resting on any surface, end A' remains free, as shown on FIG. 7B.

Figure 7D:
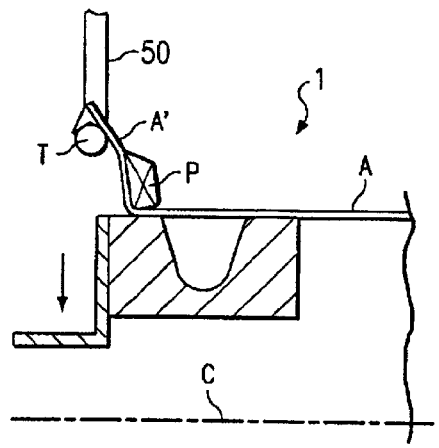
Figure 7B:
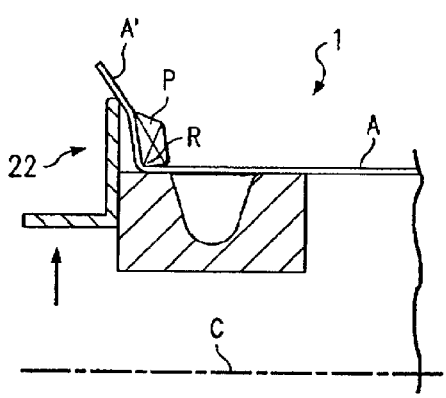
Figure 7E:
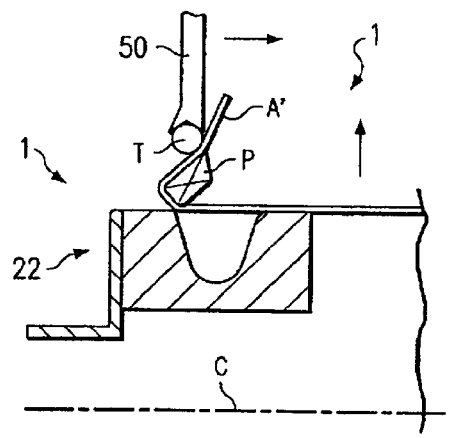
Figure 7C:
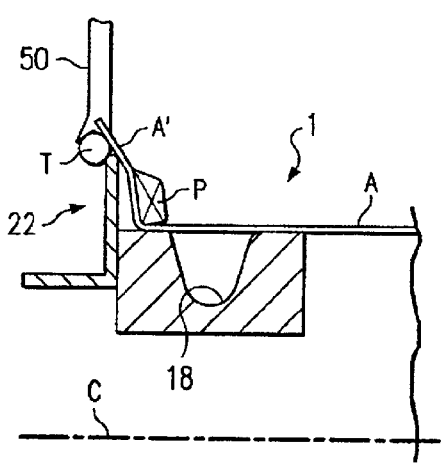

The guide bead wire 50 carrying the bead wire T is then axially advanced toward the carcass reinforcement until the free end of said reinforcement comes in contact on the bead wire T, as represented in FIG. 7C. A "braided" bead wire is involved in this example, that is, a bead wire formed by a core around which one of the strands or cords are wound in one or more layers capable of turning around the core.

According to FIG. 7D, the drive jacks 23 are stopped and the lifting fingers return to rest position by the action of to a return belt 27, end A' of the carcass reinforcement A then bearing solely on the bead wire T.

The advance of the guide bead wire 50 is then synchronized with the expansion of the drum by the expansion chambers, which radially lifts segments 41, bead wire T carrying along with it the end A' of the carcass reinforcement A and making the turn-up around the profile P, as represented in FIG. 7E.

Figure 7F:
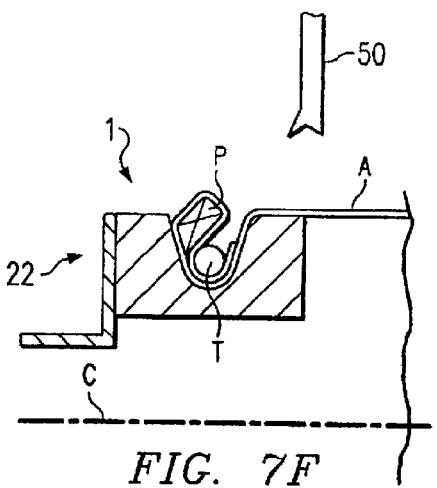

Once the bead wire T is in the axial position corresponding to the final position desired, the bead wire is relaxed and expansion of the drum to its expanded position is ended, so as to fix the position of bead wire T axially and radially, the bead wire T and profile P then being housed in the receiving groove 18, as shown in FIG. 7F.

The other component products of the tire are then placed, and the tire is vulcanized. The invention does not concern this part of the manufacture. Numerous methods are available to the expert; that is why it is unnecessary to take up this aspect of manufacture within the context of the present invention.

We claim:

1. A method of manufacture of a tire, comprising the following steps:

depositing a carcass reinforcement on a generally cylindrical radially expansible receiving surface, and on radially expansible bearing surfaces extending axially outwardly of said receiving surface, then depositing a profile of rubber compound on one of the ends of the carcass reinforcement, above the bearing surfaces, then radially deploying the bearing surfaces to lift said end of the carcass reinforcement and tilt the profile of rubber compound, then turning up said end around the profile of rubber compound, positioning a bead wire on the turn-up thus made and expanding the receiving surface so as to fix the position of bead wire axially and radially.

2. A method according to claim 1, in which the receiving surface possesses at least one receiving groove for the bead wire (T) and the profile of rubber compound (P) is deposited outside the receiving groove a distance away from the latter depending on the thickness (E) of the profile (P).

3. A method according to claim 1, in which the turn-up of the end of the carcass reinforcement around the profile of rubber compound (P) is made:

by radially raising said end, so that it is directed radially;

then by bringing the bead wire (T) axially toward the center of the carcass reinforcement (A) up to the bearing of the end (A') on the bead wire (T);

and by continuing the axial approach of the bead wire (T) in synchronization with expansion of the receiving surface.

4. A method according to claim 3, in which the end (A') of the carcass reinforcement (A) is lifted radially by pressing radially toward the outside of the drum under the profile of rubber compound (P).

* * * * *